United States Patent [19]
Gitzen

[11] Patent Number: 5,857,428
[45] Date of Patent: Jan. 12, 1999

[54] INSECT RESISTANT PLATFORM

[76] Inventor: Robert Gitzen, 2339 Hilgard #201, Berkeley, Calif. 94709

[21] Appl. No.: 960,018

[22] Filed: Oct. 29, 1997

[51] Int. Cl.⁶ .................................................... A01K 5/01
[52] U.S. Cl. ................................................................ 119/61
[58] Field of Search ........................ 119/51.5, 61; 43/131, 43/132.1; 52/101

[56] References Cited

U.S. PATENT DOCUMENTS

| | | | |
|---|---|---|---|
| 4,357,905 | 11/1982 | Carpenter | 119/61 |
| 4,784,086 | 11/1988 | Hand et al. | 119/61 |
| 4,802,302 | 2/1989 | Alnafissa | 43/114 |
| 5,042,759 | 8/1991 | Blair | 248/146 |
| 5,109,800 | 5/1992 | Williams | 119/61 |
| 5,148,626 | 9/1992 | Haake, Sr. | 43/121 |
| 5,165,365 | 11/1992 | Thompson | 119/61 |
| 5,205,242 | 4/1993 | Kasselman | 119/61 |
| 5,245,948 | 9/1993 | McClellan | 119/51.5 |
| 5,253,609 | 10/1993 | Partelow et al. | 119/101 |
| 5,485,806 | 1/1996 | Watanabe | 119/51.5 |
| 5,619,952 | 4/1997 | Walker | 119/61 |
| 5,647,299 | 7/1997 | Pearson-Falcon | 119/61 |

OTHER PUBLICATIONS

60/027983 Gitzen, Robert, Oct. 8, 1996 Provisional Patent Application for "No–Ant Platform", Abandoned.

*Primary Examiner*—Robert P. Swiatek
*Assistant Examiner*—James S. Bergin

[57] ABSTRACT

A platform for preventing crawling insects such as ants from having access to pet feeders, garbage cans, food stuffs and the like. The platform includes a removable, horizontal cover section, aligned with and parallel to a base, supporting a central, enclosed reservoir and surrounding moat barrier. A series of concentric, staggered walls and baffles runs outside of and parallel to the moat. The walls and baffles reduce evaporation of the liquid in the moat barrier, reduce contamination of the liquid by debris, and reduce spilling of the liquid if the platform is moved or knocked.

17 Claims, 6 Drawing Sheets

INSECT RESISTANT PLATFORM

BACKGROUND—FIELD OF INVENTION

The present invention relates to the field of sanitary devices, and more particularly to a novel moated insect barrier platform device maintaining pet feeders, garbage receptacles, food stuffs and the like.

BACKGROUND—DESCRIPTION OF PRIOR ART

In the past, liquid moat barriers of various configurations have been used to prevent insects such as ants from reaching and infesting food sources. Moated pet feeders such as U.S. Pat. No. 5,485,806 Watanabe; and U.S. Pat. No. 4,357,905 Carpenter are examples of moated pet feeders that incorporate the moat barrier into the bowl assembly. While these designs are somewhat effective, the consumer is forced to purchase a pet bowl whose design is compromised to incorporate the moat barrier. Also, manufacturers must tool for an item that fills a small market niche. Furthermore, the liquid is easily contaminated by food debris which can subsequently rot and cause odor. Another disadvantage is that since the surface tension of the drinking water can support the weight of ants and the like, they will routinely flail across the narrow barrier and enter the food area.

U.S. Pat. No. 5,253,609 Partelow et al. represents an improved design that places the moat underneath the bowl or receptacle and allows for separation of the food container from the moat region, facilitating easier cleaning and maintenance. Nevertheless, this design suffers from drawbacks as well. Because the moat region is relatively exposed, the liquid evaporates quickly and must be regularly re-filled. It can also be easily spilled if knocked. Furthermore, the central and narrow pedestal design is insufficiently stable for heavier loads. Finally, Partelow et al. teach that the multiple barrier design described in the patent is necessary to prevent crossing of the barrier. In fact, the addition of a small amount of liquid detergent to the water eliminates the need for wide or multiple barriers. But this improvement cannot be incorporated into their design because the aforementioned vulnerability to spillage may result in the pet consuming the soapy liquid. Also, a semi-concealed pure water barrier is vulnerable to infestation by mosquito larvae.

A more broadly useful and marketable device is a barrier platform that is designed to hold a variety of objects. U.S. Pat. No. 4,786,086 Hand et al. uses a combination of multiple-tactic, stereo kinetic, and elevational topographic barriers to prevent ants from reaching a food source. While this design has the advantage of using inert barriers, the barriers offer insufficient protection over the random and dogged determination of scouting insects such as ants.

U.S. Pat. No. 5,109,800 Williams uses a continuous and removable strip of insect repellent or, alternately, a semi-viscous substance applied by the user. While resistant to spilling, the user must peel and eventually replace the proprietary strip assembly, or wipe away and re-apply the messy semi-viscous substance.

U.S. Pat. No. 5,042,759 Blair presents an embodiment of a liquid barrier based platform that lends itself to supporting a wide range of objects, but still suffers from limitations. In order to counteract the evaporation that would occur in it's design, the entire underbody must be filled with liquid, which makes the unit relatively heavy to move and vulnerable to spillage when moved or knocked. Furthermore, this design has no provision for making it difficult for a small child or rambunctious pet to accidentally expose the liquid barrier.

In summary, while the above devices can each be applied to specific situations with at least a moderate degree of success, no single design covers a wide range of applicability. Each design falls short in one or more of the following respects;

(a) They require the handling of toxic or messy substances, or the replacement of proprietary materials.

(b) The moat barrier is exposed to contamination by debris or pet food.

(c) The moat can spill when transported.

(d) They do not lend themselves to a single, economical embodiment that will support a wide range of object sizes and weights.

(e) The moat needs to be re-filled frequently due to evaporation.

OBJECTS AND ADVANTAGES

Accordingly, several objects and advantages of the present invention are;

(a) to provide a moated barrier platform that uses a low-toxicity combination of water and a small amount of emulsifier such as liquid detergent.

(b) to provide a moated barrier platform that shields the moat barrier from contamination.

(c) to provide a moated barrier platform that is easy to fill off-site and transport without spilling.

(d) to provide a moated barrier platform with a sturdy, low profile, low cost design that can support a wide variety of objects and suit a wide variety of markets in a single embodiment.

(e) to provide a moat barrier platform with low-evaporation characteristics that results in a time span between re-fills that is measured in months.

Still further objects and advantages will become apparent from a consideration of the ensuing description and drawings.

REFERENCE NUMERALS IN DRAWINGS

| Reference Numerals in Drawings | |
|---|---|
| 10 insect resistant platform | 38 support surface |
| 12 base section | 40 holding surface |
| 14 cover section | 42 ridge |
| 16 base | 44 alignment sleeve |
| 18 handle | 46 upper baffle |
| 20 inner wall | 48 overhang |
| 22 aperture | 50 labyrinth |
| 24 outer wall | 60 second embodiment |
| 26 lower baffle | 62 modified overhang |
| 28 slosh-guards | 64 modified handle |
| 30 level indicator | 70 third embodiment |
| 32 reservoir | X isolation gaps |
| 34 moat | Y debris gap |
| 36 catch-basin | Z moat width |

SUMMARY

The platform of the present invention consists of a substantially horizontal cover section that slidably encloses a central reservoir, which feeds a surrounding moat barrier. The reservoir and moat are attached to a base and are surrounded by baffles and an overhang that reduce spilling of the liquid in the moat and reduce evaporation of the liquid. The present platform may be economically assembled from three injection molded sections, and without requiring subsequent machining operations.

Description, Preferred Embodiment—FIGS. 1–7B

Specific references are made to FIGS. 1–7B which depict the preferred embodiment of the platform.

Figure 1:
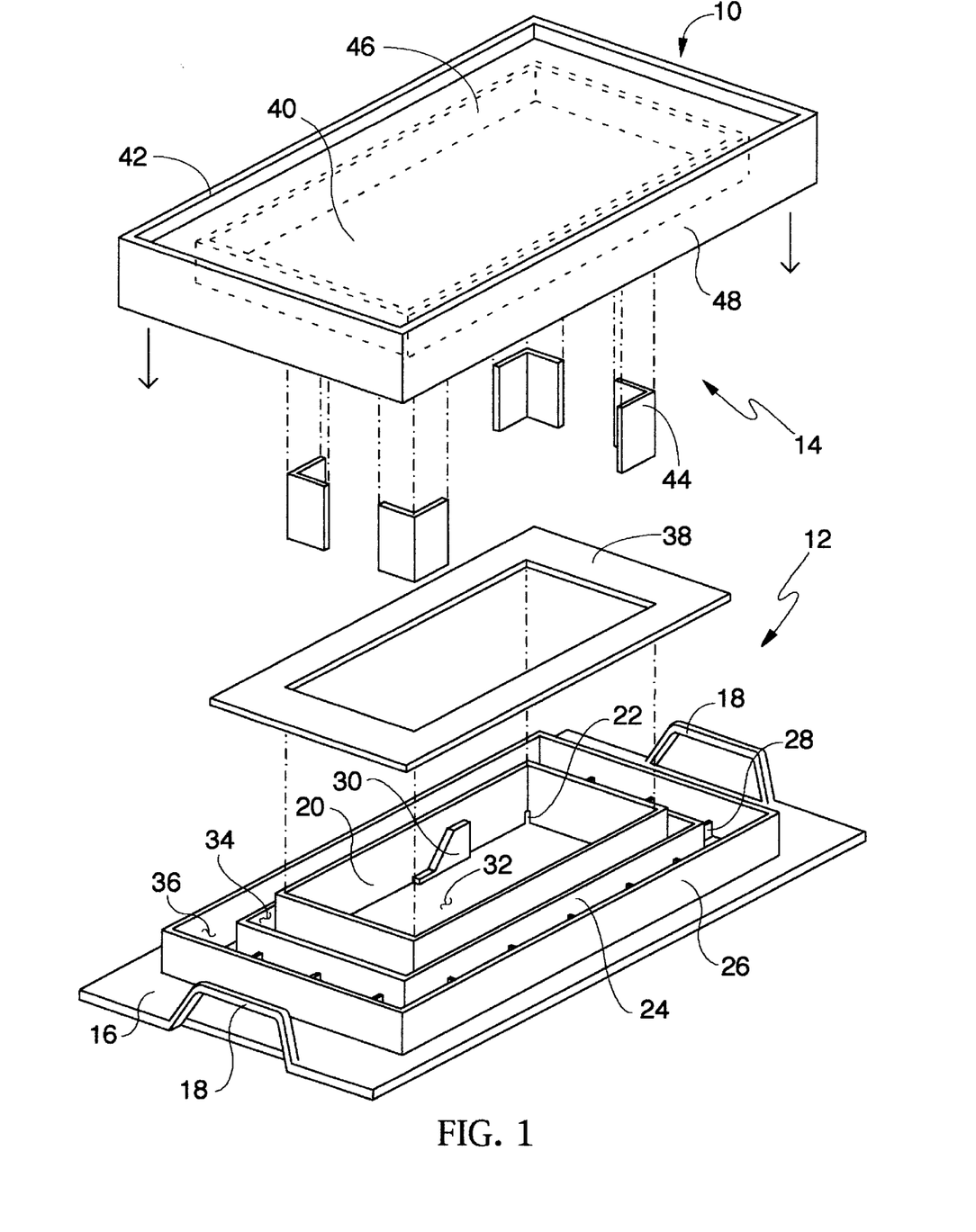
FIG. 1 is an exploded perspective view of the preferred embodiment of the platform.
Figure 3:
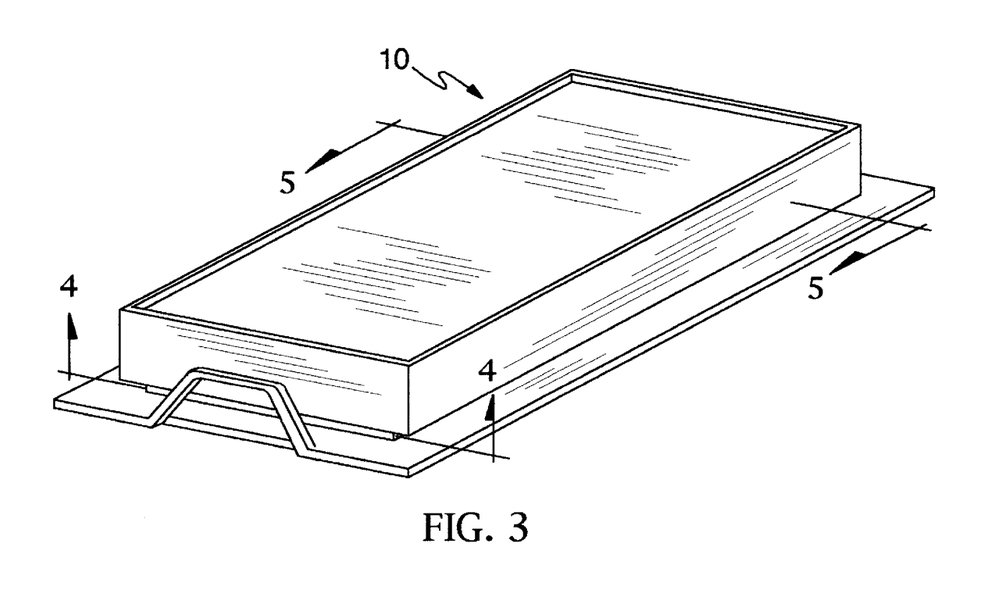
FIG. 3 is a perspective view of the assembled platform.

FIG. 3 shows that the platform 10 is of rectangular dimensions. FIG. 1 shows the platform divided into two sections; the base section 12 and the cover section 14.

The base section 12 consists of a base 16 with opposing handles 18, an inner wall 20, apertures 22, an outer wall 24, a lower baffle 26, slosh-guards 28, a support surface 38, and a level indicator 30.

Figure 4:
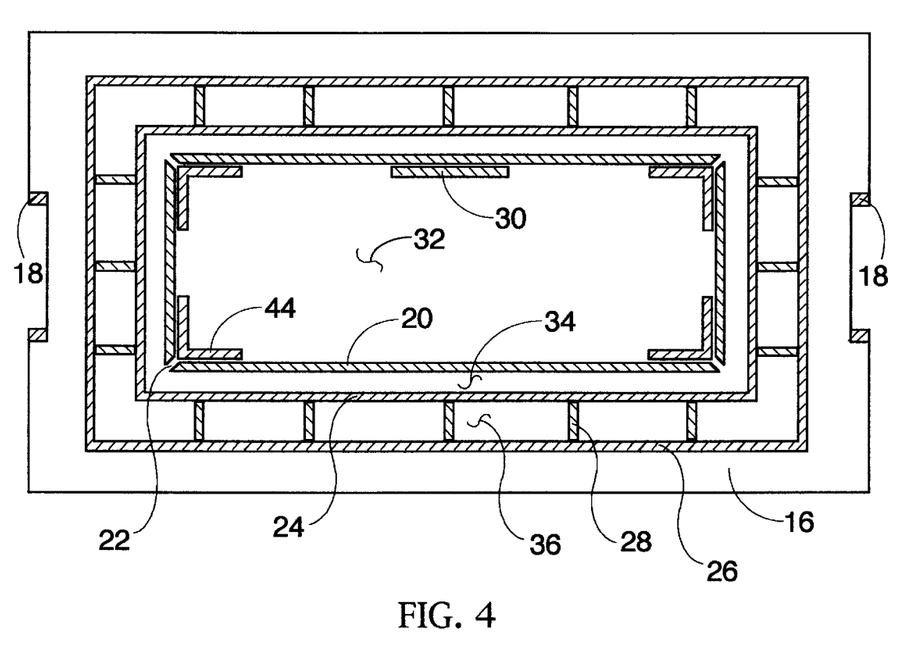
FIG. 4 is a cross-sectional view taken along line 4—4 of FIG. 3.
Figure 5:
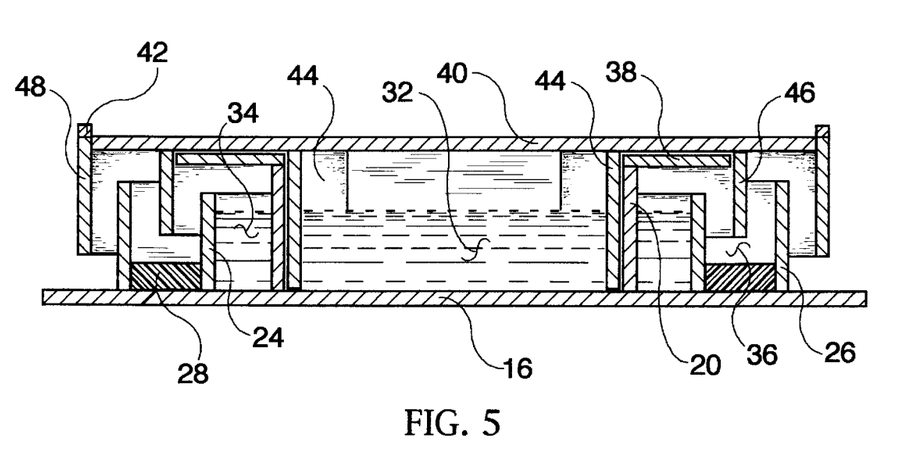
FIG. 5 is a cross-sectional view taken along line 5—5 of FIG. 3.
Figure 6:
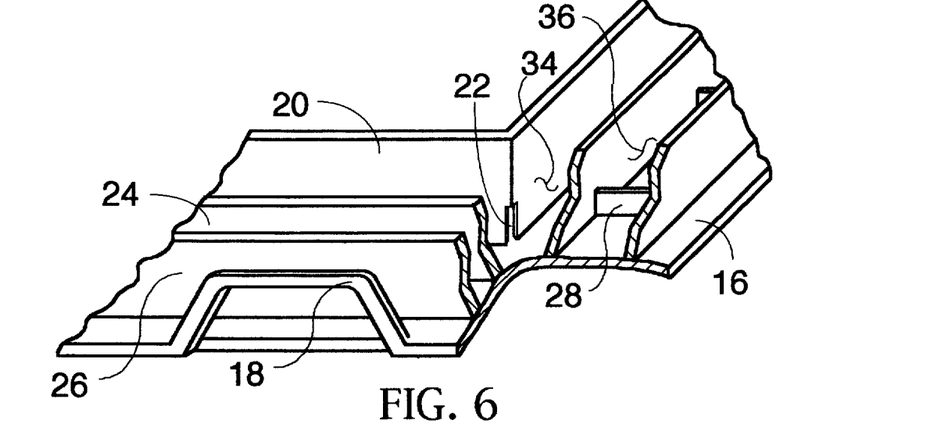
FIG. 6 shows a fragmentary view of a corner of the platform with a cutaway view showing internal structure.
Figure 7A:
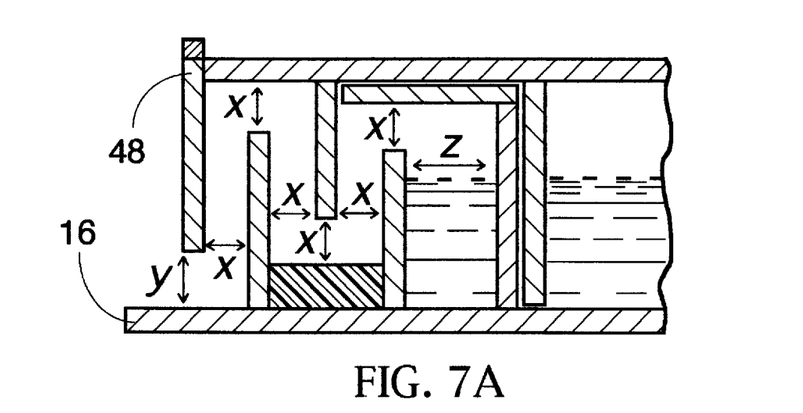
FIG. 7A shows a fragmentary view of FIG. 5 with the background cleared to show gap relationships and moat width.
Figure 7B:
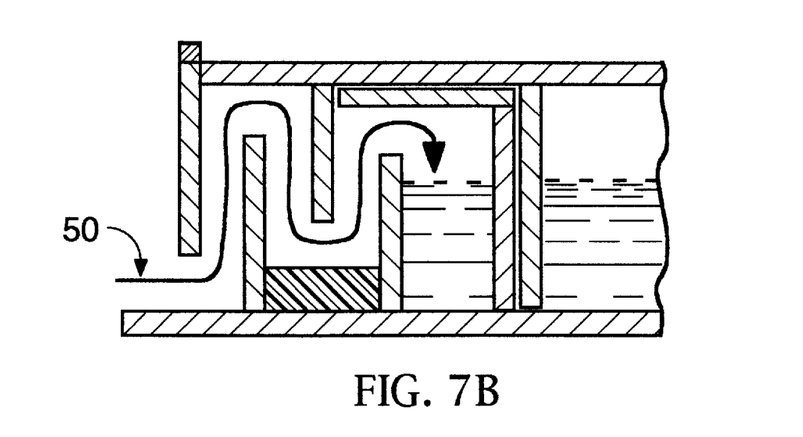
FIG. 7B shows a fragmentary view of FIG. 5 with the background cleared to show the evaporation reducing labyrinth.

The inner wall 20 forms a reservoir 32 for holding a liquid composition such as water and liquid detergent which is suitable for stopping the progress of ants and other small crawling insects. The liquid passes through apertures 22 located in the inner wall and fills a moat 34 defined by an outer wall 24 running outside of and parallel to the inner wall 20. Running parallel to and outside of the outer wall 24 is a lower baffle 26. As seen in FIGS. 4 and 5 the outer wall 24 and lower baffle 26 define a catch basin 36 for holding liquid that spills out of the moat 34. As is best seen in FIG. 5 the outer wall 24 and lower baffle 26 are of shorter vertical dimension than the inner wall 20 to maintain a spaced apart relationship to the cover section 14. Distributed throughout the catch basin are slosh-guards 28 (FIG. 4), arraigned perpendicular to the outer wall 24 and lower baffle 26. As is best seen in FIG. 6, the slosh-guards 28 are dam-like structures that retard the flow of liquid along the basin. Referring to FIG. 1, attached to the upper perimeter of the inner wall 20 is a support surface 38 that runs parallel to the base 16 and provides additional strength when the cover section 14 carries heavy loads. The support surface also provides more stable alignment of the cover section 14 with the base section 12. Aligned against the inside of the inner wall 20 is a vertical, ramp shaped level indicator 30 (FIG. 1). The base extends a predetermined distance beyond the outer horizontal dimensions of the cover section 14 so that the cover section will not contact walls or other objects which may provide a bridge for crawling insects to cross.

The cover section 14 consists of a holding surface 40, a ridge 42, alignment sleeves 44, an overhang 48, and an upper baffle 46.

Figure 2:
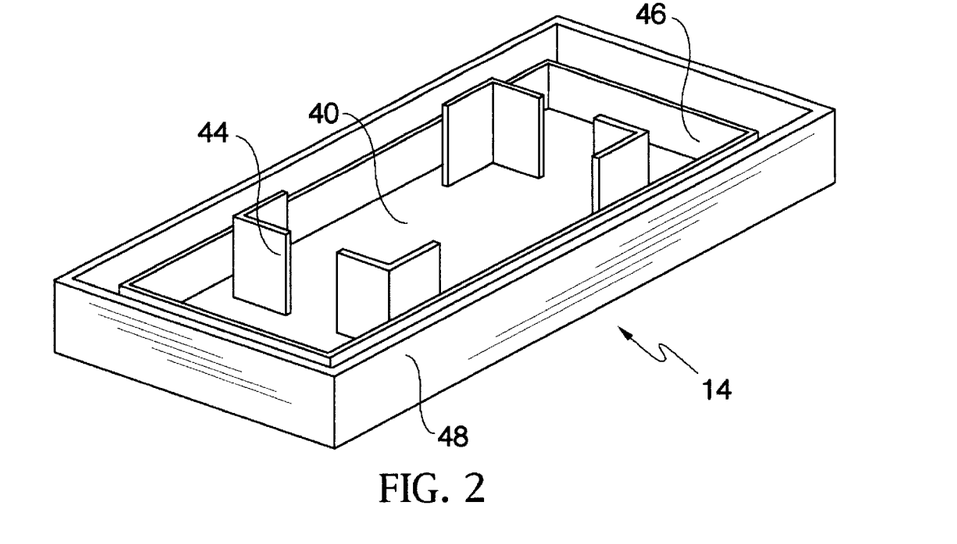
FIG. 2 is a perspective view of the underside of the cover section of the platform.

The holding surface 40 is a horizontal surface that extends outward in spaced apart and parallel relationship to the base 16. Attached to the perimeter of the holding surface 40 is a ridge 42 that extends vertically and prevents objects from sliding off of the holding surface. Attached to the underside of the holding surface are alignment sleeves 44 that fit into the inside perimeter of the inner wall to slidably and symmetrically hold in alignment the cover section 14 against the base section 12. A downward extending overhang 48 is attached to the perimeter of the holding surface 40. Attached to the underside of the holding surface is an upper baffle 46 that runs inside of and parallel to the overhang 48 (FIG. 2).

As best depicted in FIG. 5, it is seen that when the cover section 14 is slidably connected to the base section 12 the walls, baffles, overhang, and moat are positioned in a staggered, spaced-apart relationship. The isolation gaps X (FIG. 7A) between these surfaces is determined by the size of the insect that must be prevented from reaching the cover section 14. Also, the debris gap Y (FIG. 7A) between the lower edge of the overhang 48 and the base 16 may be increased to a size that would prevent food particles or other debris from bridging the air gap between the base section 12 and the cover section 14. The moat barrier width Z (FIG. 7A) is such that an insect of a given size cannot traverse the barrier before sinking. Additionally, when the cover section is slid into the base section the alignment sleeves block the apertures, slowing the transfer of liquid to the moat.

Tests with a 23 cm×33 cm×5.5 cm prototype of the present invention shows that an isolation gap X of approximately 9 mm, a debris gap Y of approximately 12 mm and a moat width Z of approximately 12.5 mm provides generous protection against crawling insects such as the argentine ant. These gaps can be scaled in either direction depending on the size of the insects and on the environmental conditions where the platform is situated.

The platform can be easily and economically constructed of suitable plastic material using the injection-molding process. It can be molded into three discreet components consisting of;

(a) base 16, lower baffle 26, slosh-guards 28, outer wall 24, level indicator 30, and handles 18.

(b) aperture 22, inner wall 20, and support surface 38.

(c) alignment sleeves 44, holding surface 40, upper baffle 46, ridge 42, and overhang 48.

The (a) and (b) components are attached by glueing or tab-locking the inner wall 20 to the base 16. An alternate means of attachment would be to have a plurality of level indicators 30 or similarly shaped protrusions evenly spaced along the inside of the inner wall 20, providing contiguous surfaces for glueing. A plurality of level indicators can also be used to key the alignment sleeves 44 over the apertures 22 in a circular embodiment of the platform. The (c) component forms the cover section 14 and is removable.

Operation, Preferred embodiment—FIGS. 1–7B

The platform 10 is set in a sink or other appropriate station, and the cover section 14 is removed. The user squirts a small amount of liquid detergent or other emulsifier (approximately one tablespoon) into the reservoir 32 and fills the reservoir with water to the top of the level indicator 30. The cover section is replaced and the user lifts the platform by grasping the handles 18 and resting their thumbs on the adjacent ridge 42.

During transport any water that may slosh out of the moat 34 is diverted into the catch-basin 36 by the upper baffle 46. If the platform is further rocked the slosh-guards 28 prevent the water in the catch-basin from accelerating to the point that it spills out of the platform entirely. Since the alignment sleeves 44 cover the apertures 22, the moat area is slow to re-fill, reducing the amount of water that is available to spill during transport.

The platform 10 is placed where needed and positioned so that no surface or debris contacts the cover section 14. Objects of a size that are appropriate to the given embodiment of the platform are placed on the holding surface 40 for protection against insect infestation. The weight of the object is distributed through the support surface 38 and down through the inner wall 20 and alignment sleeves 44 to the base 16. Since the reservoir 32 is enclosed, the bulk of the liquid in the platform cannot evaporate. The staggered walls and baffles produce a labyrinth 50 (FIG. 7B) that reduces air-flow to the moat region 34 (FIG. 6), increasing humidity at the surface of the moat and consequently reducing the rate of evaporation of the barrier liquid. Tests conducted by the inventor on a 23 cm×33 cm×5.5 cm embodiment of the platform in indoor summertime conditions resulted in a frequency of re-fill in excess of three months. Also, the semi-enclosed design prevents odor-causing contamination of the liquid for the life of each filling.

If the cover section 14 needs to be cleaned or the water level checked, the cover section is removed by grasping the cover section at opposing ends and lifting straight up. Because the alignment sleeves 44 fit snugly within the inner walls 20, lifting by one end or with uneven pull causes the cover section to pinch and jam against the inner wall. This effectively protects against accidental opening by a small child or rambunctious pet. Also, the presence of liquid detergent prevents infestation by mosquito larvae.

If the platform 10 needs to be re-filled, cleaned, or stored, it is set into the sink or other appropriate station and the cover section 14 is removed. A stream of warm water is poured into the reservoir and allowed to fill the moat and spill over the support surface 38 and into the catch basin 36. Since the platform already has detergent in it, it usually does not require any scouring to become clean. The cleaning process is repeated with the cover section. The two sections are then tipped and shaken, and then allowed to air-dry.

Figure 8:
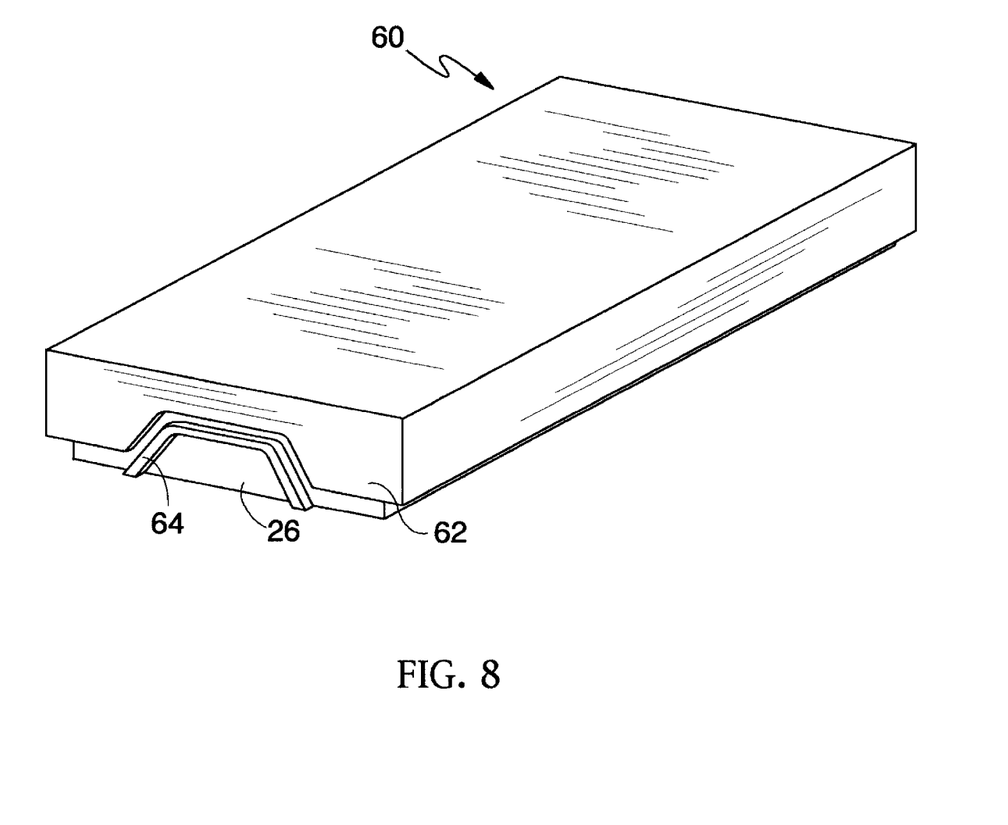
FIG. 8 is a perspective view of a second embodiment of the platform.

Description, Second Embodiment—FIG. 8

A second embodiment of the platform is illustrated in FIG. 8. The second embodiment 60 is an example of a design for spaces such as kitchen counter-tops where protrusions on the platform should be reduced. A modified handle 64 is attached to the outer vertical surface of the lower baffle 26, and the modified overhang 62 is cut out to maintain the proper gap with respect to the base section 12. Also, the ridge 42 is removed to provide an unimpeded flat surface so that cookie sheets, breadboards and the like can be balanced upon the platform.

Operation, Second Embodiment—FIG. 8

Because the base does not protrude beyond the outer perimeter of the cover section, greater care must be taken with the second embodiment so that surrounding surfaces do not contact the cover section. All other operations are identical to the preferred embodiment.

Figure 9:
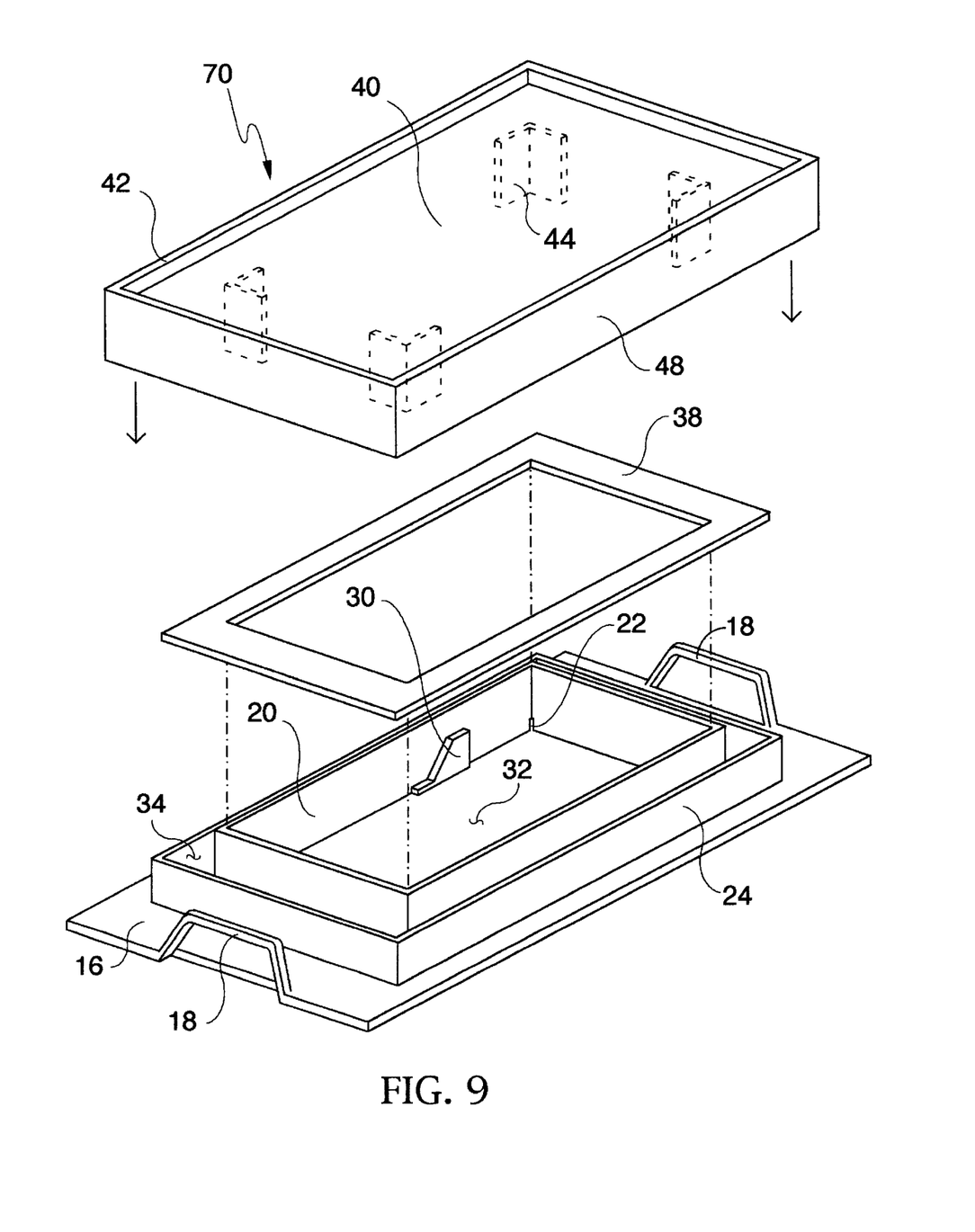
FIG. 9 is an exploded view of a third embodiment of the platform.

Description, Third Embodiment—FIG. 9

A third embodiment 70, illustrated in FIG. 9, is an example of a design for a larger embodiment for on-site filling. Larger embodiments, such as those for large garbage cans, would be too heavy to move once filled. Therefore the the upper baffle 46, lower baffle 26, slosh-guards 28, and catch-basin 36 are eliminated, saving plastic and increasing stability by moving the load bearing inner wall 20 and alignment sleeves 44 outward. Since a larger embodiment would have higher vertical dimensions, loss of the air-circulation reducing baffles is partially compensated for by the longer path that air must take to reach the moat 34.

Operation, Third Embodiment—FIG. 9

The third embodiment is filled on-site. The user squirts the appropriate amount of detergent into the reservoir 32 and then fills the platform with water by means of either a suitable container or a hose. To empty the platform, either a suitable container is used to scoop up the liquid or, if the location is appropriate, the platform is simply tipped over. The platform can then be cleaned either on-site or at a suitable station using the same technique described for the preferred embodiment.

Conclusion, Ramifications, and Scope

Thus the reader will see that the insect resistant platform of the present invention provides an economical, low profile, sturdy, and convenient means of preventing ants and other crawling insects from infesting a wide variety of attractants. Pet owners can freely choose whatever dish or weekend feeder they like. Garbage cans cease to be a food source for ants for months at a time without the need for dangerous insecticides. Frozen foods and pastries can be left on the kitchen counter to thaw overnight without infestation. The platform of the present invention provides these kinds of benefits in a more simple to operate, economical, and marketable design than the previous art.

While my above description contains many specificities, these should not be construed as limitations on the scope of the invention, but rather as an exemplification of three embodiments thereof. Variations include, but are not limited to:

adjusting the shape to suit a particular market niche or application. These shapes include but are not limited to circular, triangular, oval, U-shaped and square dimensions.

small variations in the relative angles of the walls, baffles, and overhang that do not interfere with the operation of the platform.

placing indentations in the holding surface 40 so that a plurality of platforms can hold table legs.

alternate means of measuring the liquid level, such as scribe marks on the inside of the inner wall 20, or an electronic circuit that beeps when the water level is too low.

re-positioning the handles 18 in heavier embodiments for carrying the platform when it is empty, and/or adding handles to the perimeter of the cover section 14.

adding points or layers of non-skid material to the base 16 and the holding surface 40.

molding braces into the walls, baffles, and overhang where they meet the base and holding surface in order to achieve the most efficient use of plastic, but without violating the gap limits stated in the specification.

adding a downward slope to the outer edge of the base so that the platform is lifted above surrounding debris such as grass.

placing breaks in the ridge 42 so that debris on the holding surface 40 can be easily swept onto a dust pan.

shaping the ridge 42 and holding surface 40 so as to define a feeding bowl.

Accordingly, the scope of the invention should be determined not by the embodiments illustrated, but by the appended claims and their legal equivalents.

I claim:

1. A moated insect barrier platform comprising:

a holding surface having a substantially horizontal dimension;

an overhang substantially perpendicular to and extending downward around the perimeter of said holding surface;

alignment sleeves, positioned centrally to and extending downwards from the underside of the holding surface to slidably hold the holding surface in alignment to the inside perimeter of an inner wall of closed contour defining a reservoir for holding liquid, said reservoir being centrally attached to a base, with said base being substantially parallel to and separated from the holding surface by the vertical dimension of said inner wall;

at least one aperture in the inner wall where the inner wall meets the base;

an outer wall attached to said base, outwardly parallel to and of shorter vertical dimension than the inner wall defining a moat for receiving and holding liquid from the reservoir, said overhang defining a perimeter outwardly parallel to and overlapping the outer wall and separated a predetermined distance from the outer wall and from the base.

2. The platform of claim 1, further including an upper baffle being attached to and perpendicular to the underside of the cover in an outwardly concentric relationship to the outer wall and in spaced apart relationship to the base;

a lower baffle being attached to and perpendicular to the base in an outwardly concentric relationship to the upper baffle, in an inwardly concentric relationship to the overhang, and in spaced apart relationship to the holding surface, said lower baffle defining a catch basin for directing and receiving liquid overflow from the moat barrier.

3. The platform of claim 2 wherein the spaced apart relationship between said upper baffle, said lower baffle, the base and the cover, form a gap of a predetermined dimension, said gap defining a labyrinth whereby air circulation to the moat barrier is reduced.

4. The platform of claim 2, and further including a plurality of slosh guards attached to the base, the outer wall, and the lower baffle in a perpendicular relationship and positioned at substantially regular intervals whereby the movement of liquid in said catch basin is reduced when the platform is moved.

5. The platform of claim 1, and further including two substantially vertical extensions with central openings, attached to the perimeter of the base, in opposed relationship, and in stand apart relationship to the overhang defining handles for grasping and lifting the platform.

6. The platform of claim 1, and further including a raised portion, extending upwards and around the perimeter of the cover in a substantially continuous fashion so as to provide a ridge for restricting the ejection of debris from the holding surface to the ground.

7. The platform of claim 1, and further including a support surface, radiating horizontally from the upper perimeter of the inner wall to the inside perimeter of said overhang.

8. The platform of claim 1 wherein the platform has a non-rectangular horizontal cross-section.

9. The platform of claim 1 wherein at least one aperture is positioned so that it is covered by the alignment sleeves when the platform is assembled.

10. The platform of claim 1, and further including a level indicator, of generally vertical dimension, attached to the base inside of the inner wall.

11. A method for preventing insects of a predetermined size from reaching a source of food disposed on the ground comprising:

providing a base section including;

providing a substantially horizontal base portion supporting a central reservoir for holding an insect impeding liquid, with one or more apertures in a wall of said reservoir for the transfer of said insect impeding liquid to a surrounding moat region attached to said base portion;

providing a substantially vertical lower baffle surrounding said moat region and attached to the base portion, defining a basin for catching overflow of the liquid from the moat region;

providing a cover section including;

determining the size of objects to be held on said cover section;

providing a substantially horizontal holding surface of sufficient horizontal dimension for supporting said objects;

providing vertical alignment sleeves attached to the underside of said holding surface to slidably fit inside of the wall defining said reservoir, providing symmetrical alignment of the holding surface to the base section so that it provides an air circulation resistant covering of the reservoir;

providing an upper baffle projecting downwards from the underside of the holding surface and projecting between the outer wall of the moat region and the lower baffle;

providing an overhang surrounding the perimeter of the holding surface and projecting downwards and substantially overlapping the outside of the lower baffle;

determining the size of crawling insects to be prevented from accessing the cover section;

determining a reliable minimum gap between a first and second surface for preventing said crawling insects from crossing from said first to said second surface;

said gap defining a sole insect traveling path between the base section and the cover section, said traveling path being impeded by the insect impeding liquid contained in the moat region and defining a labyrinth whereby air circulation to the moat region is reduced.

12. The method of claim 11, further providing a plurality of slosh guards attached perpendicularly to the base portion, the lower baffle and the moat region whereby a substantially regular spacing of said slosh guards restricts the flow of water in said basin.

13. The method of claim 11, further providing handles attached to the perimeter of the base portion in opposed relationship and in spaced apart relationship to said overhang for lifting and moving the base section and cover section.

14. The method of claim 11, further providing a raised ridge portion surrounding the perimeter of the holding surface in a substantially continuous manner whereby objects resting on the holding surface are prevented from sliding off.

15. The method of claim 11, further providing modified handles attached to the outer side of the lower baffle, in opposed relationship, and providing indentations in a modified overhang whereby said modified handles and said modified overhang are in spaced apart relationship.

16. The method of claim 11, wherein the base portion extends a predetermined distance beyond the horizontal perimeter of the cover section.

17. The method of claim 11, further providing a support surface, attached to the top of the wall defining the reservoir region and extending horizontally to the inside of said upper baffle whereby the cover section is provided with more stable alignment to the base section.

\* \* \* \* \*